(12) United States Patent
Schöck et al.

(10) Patent No.: US 12,434,206 B2
(45) Date of Patent: Oct. 7, 2025

(54) STATIC MIXER FOR MIXING AT LEAST TWO COMPONENTS WITH AN EXCHANGE ELEMENT

(71) Applicant: medmix Switzerland AG, Haag (CH)

(72) Inventors: Joachim Schöck, Winterthur (CH); Bettina Gielow, Gams (CH); Fabian Hutter, Diepoldsau (CH)

(73) Assignee: medmix Switzerland AG, Haag (CH)

( * ) Notice: Subject to any disclaimer, the term of this patent is extended or adjusted under 35 U.S.C. 154(b) by 524 days.

(21) Appl. No.: 17/923,299

(22) PCT Filed: Apr. 12, 2021

(86) PCT No.: PCT/EP2021/059443
§ 371 (c)(1),
(2) Date: Nov. 4, 2022

(87) PCT Pub. No.: WO2021/223962
PCT Pub. Date: Nov. 11, 2021

(65) Prior Publication Data
US 2023/0234006 A1   Jul. 27, 2023

(30) Foreign Application Priority Data
May 5, 2020   (EP) .................................... 20173054

(51) Int. Cl.
*B01F 25/432* (2022.01)
*B01F 25/431* (2022.01)

(52) U.S. Cl.
CPC .... *B01F 25/4321* (2022.01); *B01F 25/43197* (2022.01)

(58) Field of Classification Search
CPC .......... B01F 25/43161; B01F 25/43171; B01F 25/4318; B01F 25/431974;
(Continued)

(56) References Cited

U.S. PATENT DOCUMENTS

| 3,643,927 A | 2/1972 | Crouch |
| 4,632,568 A | 12/1986 | Emele et al. |

(Continued)

FOREIGN PATENT DOCUMENTS

| CN | 101001731 A | 7/2007 |
| CN | 102989337 A | 3/2013 |

(Continued)

OTHER PUBLICATIONS

Chinese Office Action issued Nov. 30, 2023 in corresponding Chinese Application No. 202180033520.0 (Google Machine Translation).

(Continued)

*Primary Examiner* — Charles Cooley
(74) *Attorney, Agent, or Firm* — Global IP Counselors, LLP (57) ABSTRACT

A static mixer includes a mixer housing, a mixing element including mixing bodies arranged one after another along a longitudinal axis so as to be capable of repeated separation and recombination of components, each of the mixing bodies including a first and second inlets, first and second lateral outlets and an intermediate outlet disposed between the first and the second lateral outlet, an input wall separating the first and second inlets, a deflection element arranged downstream of and adjacent to the input wall, first and second output walls arranged downstream of and adjacent to the deflection element, the first output wall separating the first lateral outlet and the intermediate outlet and the second output wall separating the intermediate outlet and the second lateral outlet.

20 Claims, 9 Drawing Sheets

(58) Field of Classification Search
CPC ............ B01F 25/43162; B01F 25/3131; B01F 25/4321; B01F 25/43197; B01F 23/47; B01F 25/431
USPC .......................................................... 366/337
See application file for complete search history.

(56) References Cited

U.S. PATENT DOCUMENTS

| | | | |
|---|---|---|---|
| 5,944,419 A * | 8/1999 | Streiff | B01F 25/4321 366/337 |
| 6,540,395 B2 * | 4/2003 | Muhlbauer | A61C 9/0026 366/329.1 |
| 6,773,156 B2 * | 8/2004 | Henning | B29C 48/362 366/337 |
| 7,841,765 B2 | 11/2010 | Keller | |
| 8,083,397 B2 * | 12/2011 | Pappalardo | B01F 25/432 366/337 |
| 8,753,006 B2 | 6/2014 | Habibi-Naimi | |
| 9,242,214 B2 * | 1/2016 | Pappalardo | B01F 25/4321 |
| 9,724,653 B2 * | 8/2017 | Pappalardo | B01F 25/4321 |
| 10,232,327 B2 * | 3/2019 | Pappalardo | B01F 25/4321 |
| 10,245,565 B2 * | 4/2019 | Pappalardo | B01F 33/50112 |
| 10,245,566 B2 * | 4/2019 | Linne | B01F 25/4321 |
| 10,293,311 B2 | 5/2019 | Linne et al. | |
| 10,363,526 B2 * | 7/2019 | Pappalardo | B01F 23/47 |
| 10,946,349 B2 | 3/2021 | Linne et al. | |
| 11,020,716 B2 * | 6/2021 | Grünenfelder | B01F 35/561 |
| 2004/0008576 A1 | 1/2004 | Henning | |
| 2008/0056064 A1 | 3/2008 | Tanaka | |
| 2011/0141844 A1 | 6/2011 | Schell | |
| 2011/0288631 A1 | 11/2011 | Chen et al. | |
| 2013/0021868 A1 | 1/2013 | Doolin et al. | |
| 2013/0107660 A1 * | 5/2013 | Pappalardo | B01F 25/4321 29/527.1 |
| 2016/0236161 A1 | 8/2016 | Pappalardo | |
| 2017/0036179 A1 | 2/2017 | Pappalardo | |
| 2017/0036180 A1 | 2/2017 | Pappalardo | |
| 2017/0120206 A1 | 5/2017 | Hiemer et al. | |
| 2017/0252708 A1 | 9/2017 | Pappalardo | |
| 2017/0341041 A1 | 11/2017 | Linne et al. | |
| 2018/0257047 A1 | 9/2018 | Pappalardo | |
| 2023/0234006 A1 * | 7/2023 | Schöck | B01F 25/4321 |

FOREIGN PATENT DOCUMENTS

| | | | |
|---|---|---|---|
| CN | 103906562 A | 7/2014 | |
| CN | 106943909 A | 7/2017 | |
| DE | 10322922 A1 | 12/2004 | |
| DE | 202012009704 U1 | 2/2014 | |
| DE | 102017117198 A1 * | 1/2019 | .......... B01F 25/4321 |
| DE | 202018106654 U1 * | 2/2019 | ............ B33Y 80/00 |
| DE | 202018105564 U1 | 3/2019 | |
| EP | 1312409 B1 | 6/2003 | |
| EP | 2133138 A1 | 12/2009 | |
| EP | 2133138 B1 | 4/2011 | |
| EP | 2548634 A1 | 1/2013 | |
| EP | 2614883 A1 | 7/2013 | |
| EP | 3059006 A1 | 8/2016 | |
| EP | 3338882 A1 | 6/2018 | |
| EP | 3342479 A1 * | 7/2018 | .......... B67D 3/0012 |
| JP | 4298652 B2 | 4/2009 | |
| JP | 2019030874 A | 2/2019 | |
| JP | 2019507010 A | 3/2019 | |
| WO | 2017072079 A1 | 5/2017 | |

OTHER PUBLICATIONS

Chinese Search Report issued Nov. 25, 2023 in corresponding Chinese Application No. 202180033520.0.
International Search Report issued Jun. 22, 2021 in corresponding International Application No. PCT/EP2021/059443.
European Search Report issued Oct. 26, 2020 in corresponding European Application No. 20173054.6.

* cited by examiner

STATIC MIXER FOR MIXING AT LEAST TWO COMPONENTS WITH AN EXCHANGE ELEMENT

CROSS-REFERENCE TO RELATED APPLICATION

This application is a U.S. National Stage application of International Application No. PCT/EP2021/059443, filed Apr. 12, 2021, which claims priority to European Patent Application No. 20173054.6, filed Can 5, 2020, the contents of each of which are hereby incorporated by reference.

BACKGROUND

Technical Field

The disclosure relates to a static mixer for mixing together at least two components.

Background Information

Conventional static mixers for mixing together at least two components are known. These conventional static mixers generally comprise a mixing element arranged in a mixer housing which divides and rearranges a stream containing the at least two components such that the at least two components are intermixed more and more while flowing through the static mixer. The mixing element can comprise a plurality of mixing bodies arranged one after another along a longitudinal axis of the mixing element.

In conventional static mixers with mixing bodies, independent of the quantity of mixing bodies used, there can be a region extending through the static mixer along its longitudinal direction, in which at least one of the components flows unaffected through the static mixer. In most of the cases, this region is located adjacent to the mixer housing. A complete mixing of the at least two components throughout the cross section of the static mixer is therefore hindered, in a worst case even rendered impossible.

SUMMARY

In view of the above, it is an object of the present disclosure to provide an improved static mixer. In particular, it is an object of the present disclosure to provide a static mixer in which a region of unaffected flow of at least one of the at least two components through the static mixer is prohibited.

This objective is solved by the embodiments of a static mixer disclosed herein.

According to an aspect of the disclosure the objective is solved by a static mixer for mixing together at least two components comprising:
 a mixer housing;
 a mixing element having a longitudinal axis, an upstream end and a downstream end and being arranged at least partly within the mixer housing, the mixing element comprising a plurality of mixing bodies arranged one after another along the longitudinal axis for a repeated separation and re-combination of streams of the components to be mixed,
wherein the mixing bodies comprise:
 a first inlet and a second inlet;
 a first and a second lateral outlet and an intermediate outlet disposed between the first and the second lateral outlet;
 an input wall separating the first inlet and the second inlet and extending in the direction of the longitudinal axis;
 a deflection element which is arranged downstream of and adjacent to the input wall and which extends transverse to the input wall at both sides of the input wall;
 a first output wall and a second output wall which are arranged downstream of and adjacent to the deflection element, which extend in the direction of the longitudinal axis and which are spaced apart, wherein the first output wall separates the first lateral outlet and the intermediate outlet and the second output wall separates the intermediate outlet and the second lateral outlet;
 wherein the deflection element comprises a first opening, a second opening and a third opening each extending through the deflection element from an upstream side of the deflection element to a downstream side of the deflection element, the first opening being arranged at one side of the input wall and connecting the first inlet with the intermediate outlet, and the second and the third opening being arranged at the other side of the input wall and connecting the second inlet with the first and the second lateral outlet;
wherein at least one exchange element is arranged between two successive mixing bodies, the exchange element comprising a further deflection element which extends transverse to the longitudinal axis and which is positioned and sized to prevent that the stream of the components exiting the first lateral outlet flows through the exchange element in the direction of the longitudinal axis and to deflect the stream in a direction transverse to the longitudinal axis towards the second lateral outlet.

A static mixer according to the present disclosure can be used to mix together at least two components, in particular fluid or past-like components. A mixing element comprising a plurality of mixing bodies is at least partly arranged within the mixer housing. The mixing element comprises and defines a longitudinal direction for the static mixer as a whole and hence also for the respective mixing bodies and the overall flow of components through the static mixer. Of the mixing bodies, which are arranged one after another along a longitudinal axis of the mixing element, each comprises two inlets and three outlets. The first and second inlet are separated along the longitudinal axis by an input wall, the outlets by two outlet walls, whereby the first outlet wall separates a first lateral outlet from an intermediate outlet, and the second outlet wall separates the aforementioned intermediate outlet from a second lateral outlet. Preferably, the input wall and both the first output wall and the second output wall, respectively, are arranged along the longitudinal axis and rotated by 90° with respect to each other.

Especially, the respective mixing body comprises a deflection element extending transverse to the longitudinal direction and filling the cross section of the mixer housing. Hence the deflection element essentially separates the first and second inlets front the first, second and intermediate outlets of the mixing body. The deflection element comprises three openings, a first opening being arranged at one side of the input wall and connecting the first inlet with the intermediate outlet, and the second and the third opening being arranged at the other side of the input wall and connecting the second inlet with the first and the second lateral outlet. In other words, the part of the mixing body upstream of the deflection elements divides the incoming stream of components to be mixed in two parts, whereby one of these parts is subsequently fed through the first opening into the intermediate outlet, and the other part is split and fed through the second and third opening into the first lateral outlet and the second lateral outlet, respectively. As already described above, the outlets preferably are rotated with respect to the inlets by 90° and hence the plurality of mixing bodies arranged one after another along the longitudinal axis provide by repeatedly separating and recombining of the part of the stream a profound mixing of the at least two components to be mixed.

Additionally, a static mixer according to the present disclosure further comprises at least one exchange element arranged between two successive mixing bodies. In other words, the upstream side of the at least one exchange element is connected in a fluid communicating way to the first, intermediate and second outlet of the previous mixing body, its respective downstream side of the at least one exchange element is connected in a fluid communicating way to the first and second inlet of the ensuing mixing body. An exchange element according to the present disclosure comprises a further deflection element which extends transverse to the longitudinal axis. In other word, the further deflection element at least partly blocks the stream of components along the longitudinal axis. Preferably, the further deflection element of the exchange element is aligned parallel to the deflection elements comprised by the mixing bodies.

Especially, the further deflection element is constructed such that it redirects a flow coming from the first lateral outlet of the previous mixing body in direction of the flow coming from the respective second lateral outlet. This redirection in particular includes a deflection of the stream of components coming from the first lateral outlet transverse to the longitudinal axis. In other words, by redirecting the flow coming from the first lateral outlet in direction to the second lateral outlet, the exchange element effectively prohibits that components coming from the first lateral outlet flow in direction of the longitudinal axis. Regions in which the flow of the components is unaffected, which might occur especially at the outer rim of the mixing bodies next to the mixer housing and hence in the part of the respective mixing body, in which the stream of components is guided through the second inlet and the first lateral outlet, can therefore be addressed and effectively be avoided. The overall mixing of the at least two components by a static mixer according to the present disclosure can therefore be improved.

In addition, a static mixer according to the present disclosure can be characterized in that the further deflection element extends from an inner wall of the mixer housing at least until a center plane of the mixing element running through the longitudinal axis and through the intermediate outlet, whereby preferably the first output wall and the second output wall are running parallel to each other and to the longitudinal axis and wherein the center plane is defined by the mid-plane between the first and the second output wall. The inner wall of the mixer housing defines the maximal radial position of the stream of components through the mixing body, the center plane running through the longitudinal axis virtually divides the volume inside the mixer housing in two halves of at least essentially identical size. By extending from the inner wall of the mixer housing at least until the center plane of the mixing element it can especially easily be assured to completely address the stream of components leaving the first lateral outlet of the previous mixing body. In addition, a mixing body in which the first output wall and the second output wall are running parallel to each other and to the longitudinal axis and wherein the center plane is defined by the mid-plane between the first and the second output wall, automatically defines the first lateral outlet, which is defined between the mixer housing and the first output wall, such that it ends spaced apart from the center plane. Hence the addressing of the complete stream coming out of the first lateral outlet by the further deflection element is ensured further.

In particular, a static mixer according to the present disclosure can comprise that, when seen from the downstream end of the mixing element in the direction of the longitudinal axis, the further deflection element covers the complete first lateral outlet. In other words, the complete stream of components exiting the first lateral outlet impinges on the further deflection element. Automatically, all of the components leaving the previous mixing body through the first lateral outlet are deflected on the further deflection element in direction of the second lateral outlet.

In a further improvement of a static mixer according to the present disclosure, when seen from the downstream end of the mixing element in the direction of the longitudinal axis, the further deflection element covers at least a part of the intermediate outlet, in particular at least partially until the center plane of the mixing element, preferably until the second output wall. The intermediate outlet is located adjacent to the first lateral outlet. By covering at least a part of the intermediate outlet, especially in addition to the aforementioned complete coverage of the first lateral outlet, coverage of edge regions of the first lateral outlet neighboring the intermediate outlet by the further deflection element can be ensured especially easily.

A further embodiment of a static mixer according to the present disclosure can comprise that the further deflection element comprises a first deflection section extending transverse to the longitudinal axis and a first guiding wall extending in the direction to the longitudinal axis and having a first edge and a second edge, at least a first part of the first edge being connected to the first deflection section. In other words, it is not necessary that the deflection element comprises a continuous part assigned and facing the first lateral outlet. This facing part of the further deflection element can also be fragmented and comprise at least one deflection section extending transverse to the longitudinal axis and assigned and facing the first lateral outlet, whereby an additional first guiding wall is provided as part of the further deflection element, connected to the first deflection section at least at a first part of a first edge of the first guiding wall. A slipping through of parts of the stream of components coming from the first lateral outlet around the first deflection section in direction of the longitudinal axis can therefore prohibited, especially by the first guiding wall and its connection to the first deflection section.

Additionally, a static mixer according to the present disclosure can be improved by that the further deflection element comprises a second deflection section extending transverse to the longitudinal axis and Wherein at least a first part of the second edge of the first guiding wall is connected to the second deflection section. In this preferred improvement of the aforementioned embodiment of a static mixer according to the present disclosure, the first guiding wall is connected on its first edge to a first deflection section, and is additionally connected on its second edge with a second deflection section of the further deflection element also extending transverse to the longitudinal axis. The second edge is preferably located upstream to the first edge along the longitudinal direction of the static mixer. In other words, the part of the further deflection element assigned and facing the stream of components coming from the first lateral output of the previous mixing body is divided in two, the first and second deflection section, respectively, whereby these two parts are arranged spaced apart with respect to the longitudinal direction but nevertheless are connected by the first guiding wall. Hence, also in this preferred embodiment all of the components leaving the previous mixing body through the first lateral outlet are automatically deflected on the first and second deflection sections of the further deflection element in direction of the second lateral outlet, whereby the first guiding wall arranged between the two deflection sections ensures a component-tight connection of the two deflection sections.

In a further improved embodiment, a static mixer according to the present disclosure comprises that the further deflection element comprises a third deflection section extending transverse to the longitudinal axis and wherein the third deflection section is connected to a second part of the first edge of the first guiding wall. In other words, the third deflection section is positioned in the exchange element such that streams of components coming from the intermediate outlet and/or the second lateral outlet are blocked in their flow along the longitudinal axis. An exchange of flow directions and hence a mixing of the at least two components in a static mixer according to the present disclosure can therefore be improved further.

Additionally, a further improved embodiment of a static mixer according to the present disclosure can comprise that the first deflection section and the second deflection section are arranged at opposite sides of the first guiding wall, and/or wherein the first deflection section and the third deflection section are arranged at opposite sides of the first guiding wall. In both cases, a coverage of the cross section of the mixer housing perpendicular to the first guiding wall both by the first deflection section and the second deflection section, and by the first deflection section and the third deflection section, respectively, can be improved. A clearance volume between the first deflection section and either the second deflection section or the third deflection section, in which part of the flowing components could get caught, can be avoided.

In a preferred improved embodiment, a static mixer according to the present disclosure can be characterized in that the first and the third deflection sections each covers a quarter of the cross section of the mixing housing. As the first and third deflection section are connected to the first guiding wall at its first edge, preferably on opposite sides of the first guiding wall, this embodiment effectively comprises a quartered entrance section of the exchange element, whereby two diagonally arranged quarters are blocked by the first and third deflection sections, and the other quarters are free for a flow of the stream of components. Hence the fraction of the stream of components affected in its flow already by the first and third deflection section and simultaneously the remaining free cross section for the total flow of components through the exchange element can be optimized.

Further, an embodiment of a static mixer according to the present disclosure can be improved by that the first guiding wall is disposed at an upstream side of the first and/or of the third deflection section. As described above, the first guiding wall extends along the longitudinal direction, and the first deflection section, in particular also the third deflection section, are arranged at the first edge of the first guiding wall. In other words, by arranging the first guiding wall at an upstream side of the first and/or the third deflection section, the first guiding wall already divides the incoming stream of components, whereby the deflection sections arranged downstream of the first guiding wall subsequently direct the respective part of the stream of components at least temporarily transverse to the longitudinal direction. Especially in the preferred embodiment comprising first and third deflection sections each covering a quarter of the cross section of the mixing housing, an addressing of the whole stream of components through the exchange element can be provided more easily.

In addition, a static mixer according to the present disclosure can be characterized in that a second guiding wall extending in the direction to the longitudinal axis is provided at a downstream side of the first and/or of the third deflection section, wherein the first guiding wall and the second guiding wall are rotated with respect to one another about the longitudinal axis by an angle of 90°. Especially, the first guiding wall and the second guiding wall are preferably arranged on opposite sides of the first and/or third deflection section with respect to the longitudinal direction. As the first guiding wall and the second guiding wall are rotated with respect to each other by 90°, also the divisions impressed into the stream of components by the respective first and second guiding wall are rotated to each other. In the aforementioned embodiment comprising first and third deflection sections each covering a quarter of the cross section of the mixing housing, the second guiding wall follows the openings left free in the cross section of the mixing housing. An immediate re-mixing of the sub-streams of components after the first and third deflection section can therefore be prohibited.

In another embodiment, the static mixer according to the present disclosure can comprise that a third guiding wall extending in the direction to the longitudinal axis, preferably running parallel to the second guiding wall, is disposed at the downstream side of the first and/or of the third deflection section. The third guiding wall can be provided alternatively or additionally to the second guiding wall and can provide all advantages described above with respect to the second guiding wall. By providing both a second guiding wall and a third guiding wall, respectively, and appropriate provided openings in the further deflection element with respect to the cross section of the mixer housing, a partition of the stream of components in three different parts provided by the further deflection element can be provided by an exchange element of a static mixer according to the present disclosure.

Further, an embodiment of a static mixer according to the present disclosure can be improved by that a fourth guiding wall extending in the direction to the longitudinal axis, preferably running parallel to the first guiding wall, disposed at a downstream side of at least parts of the deflection element. The first guiding wall divides the incoming stream of components to be mixed in two sub-streams. The fourth guiding wall can be provided additionally to the first guiding wall and can provide all advantages described above with respect to the first guiding wall also at a downstream side of at least parts of the deflection element. Similar to the second and third guiding walls, by providing both a first guiding wall and a fourth guiding wall, respectively, and appropriate provided openings in the further deflection element with respect to the cross section of the mixer housing, a partition of the stream of components in three different parts can be provided by an exchange element of a static mixer according to the present disclosure.

In addition, a static mixer according to the present disclosure can be characterized in that a fifth guiding wall extending in the direction to the longitudinal axis, preferably running at an angle, in particular at an angle of 90°, to the first guiding wall, is disclosed at an upstream side of the second deflection section. As this fifth guiding wall is arranged at an upstream side of the second deflection section, it is automatically arranged at an upstream end of the exchange element. Hence, the fifth guiding wall already provides a partition of the incoming stream of components in two sub-streams. The subsequent deflection sections and guiding walls, respectively, of the exchange element can therefore be provided already with pre-partitioned incoming sub-streams of components. The internal flow deflection of the stream of components in the exchange element can therefore be provided more easily.

Further, embodiments of a static mixer according to the present disclosure can be characterized in that two successive adjacent mixing bodies have the same structure but are rotated with respect to one another about the longitudinal axis by an angle of 180°, and/or that two successive mixing bodies which are separated by an exchange element have the same structure and the same orientation with respect to the longitudinal axis, and/or that the mixing element comprises two exchange elements, whereby the two exchange elements have the same structure but are rotated with respect to one another about the longitudinal axis by an angle of 180°. In all these embodiments, an internal structure of the mixing element with respect to arrangement order and respective orientation of its members is provided such that a mixing of the at least two components by the static mixer according to the present disclosure can be improved. A relative orientation of two successive adjacent mixing bodies of 180°, the usage of an exchange element between identical mixing bodies, both in structure and orientation, and/or a usage of two exchange elements with a relative orientation of 180° can provide this improvement of mixing of the at least two components to be mixed.

BRIEF DESCRIPTION OF THE DRAWINGS

Embodiments of the invention will be explained in more detail hereinafter with reference to the drawings.

DETAILED DESCRIPTION

In the following, any statement made having regard to the direction of a component is made relative to the position shown in the drawing and can vary in the actual position of application. The description of the accompanying drawings is only by the way of example. Specific features of each aspect of the present disclosure and the figures can be combined with each other if of technical sense.

Figure 1:
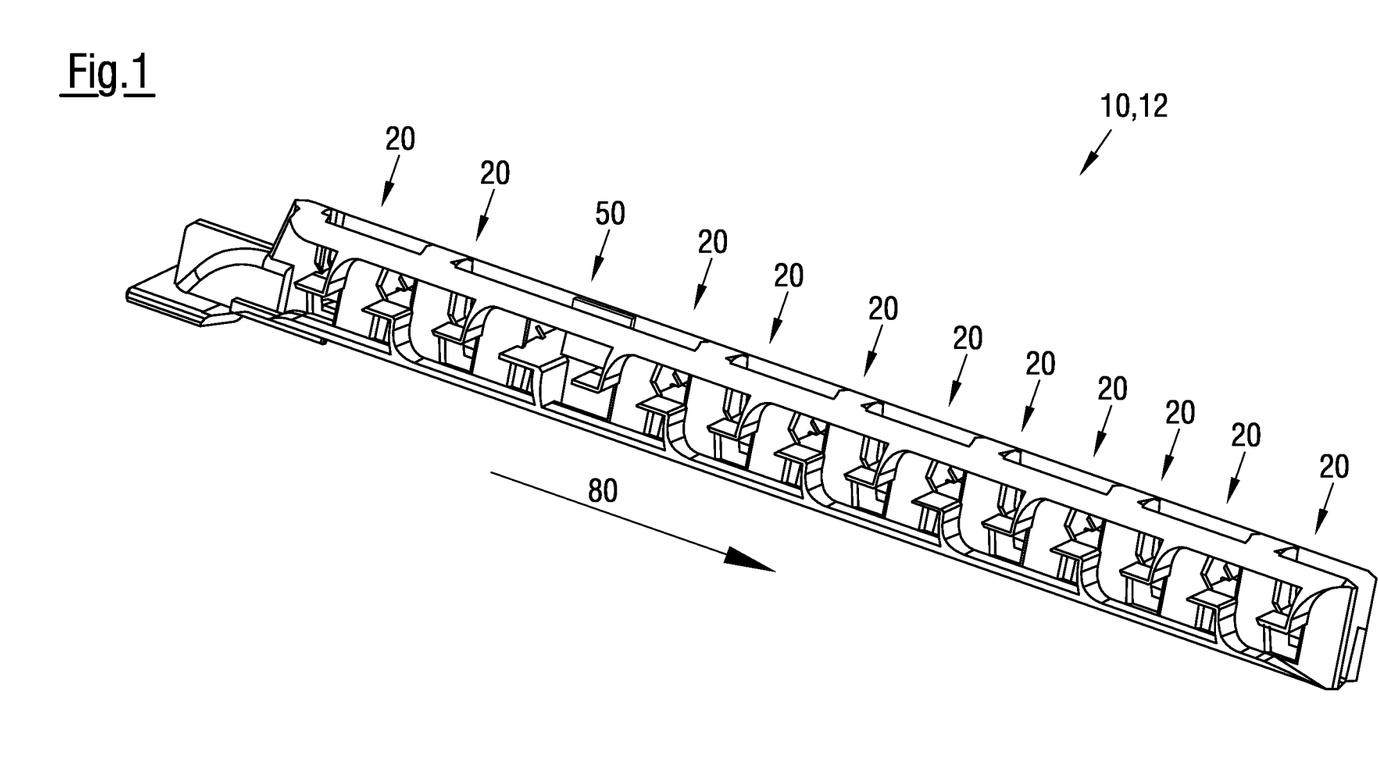
FIG. 1 is a first possible embodiment of a static mixer according to the disclosure.

FIG. 1 shows a first possible embodiment of a static mixer 10 according to the present disclosure, especially the respective mixing element 12, which can be arranged in a mixer housing 14 (see FIGS. 8, 9) of the static mixer 10. The mixing element 12 of the static mixer 10 comprises several mixing bodies 20 arranged adjacent to each other along a longitudinal direction 80 of the static mixer 10. The mixing bodies 20 of the present embodiment are identically constructed, wherein two successive mixing bodies 20 are rotated with respect to one another about the longitudinal axis 80 by an angle of 180°. At least two components to be mixed can be filled into the static mixer 10 at an upstream end, flow through the mixing element 12 and are consecutively mixed together. Between one of the pairs of subsequent mixing bodies 20, an exchange element 50 is arranged, whereby the mixing bodies 20 adjacently arranged to the exchange element 50 comprise the same orientation. Regions of unmixed components can be prohibited by this exchange element 50, as described with respect to the following FIGS. 2 to 6.

Figure 2:
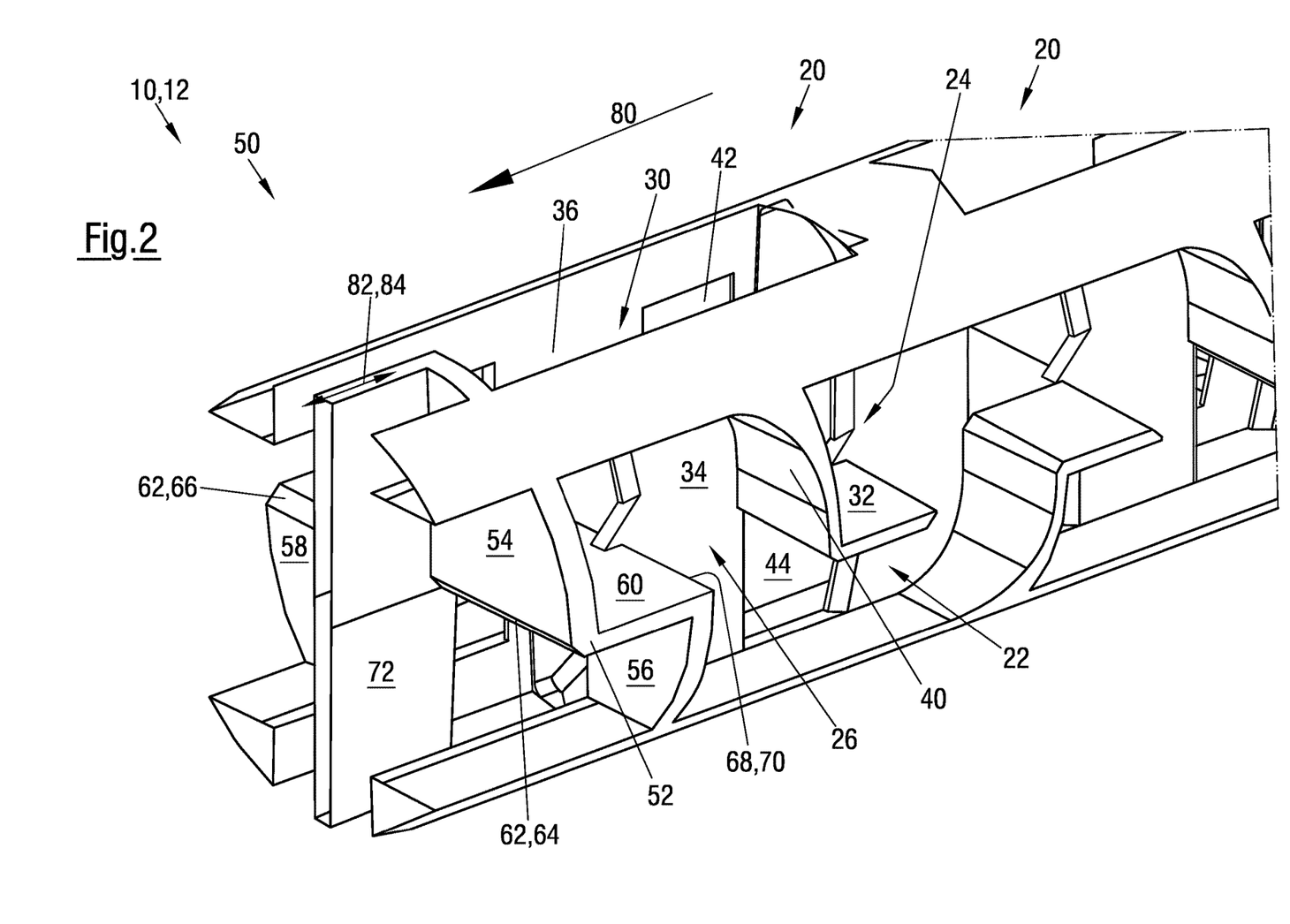
FIG. 2 is a first view of a first possible embodiment of an exchange element.
Figure 3:
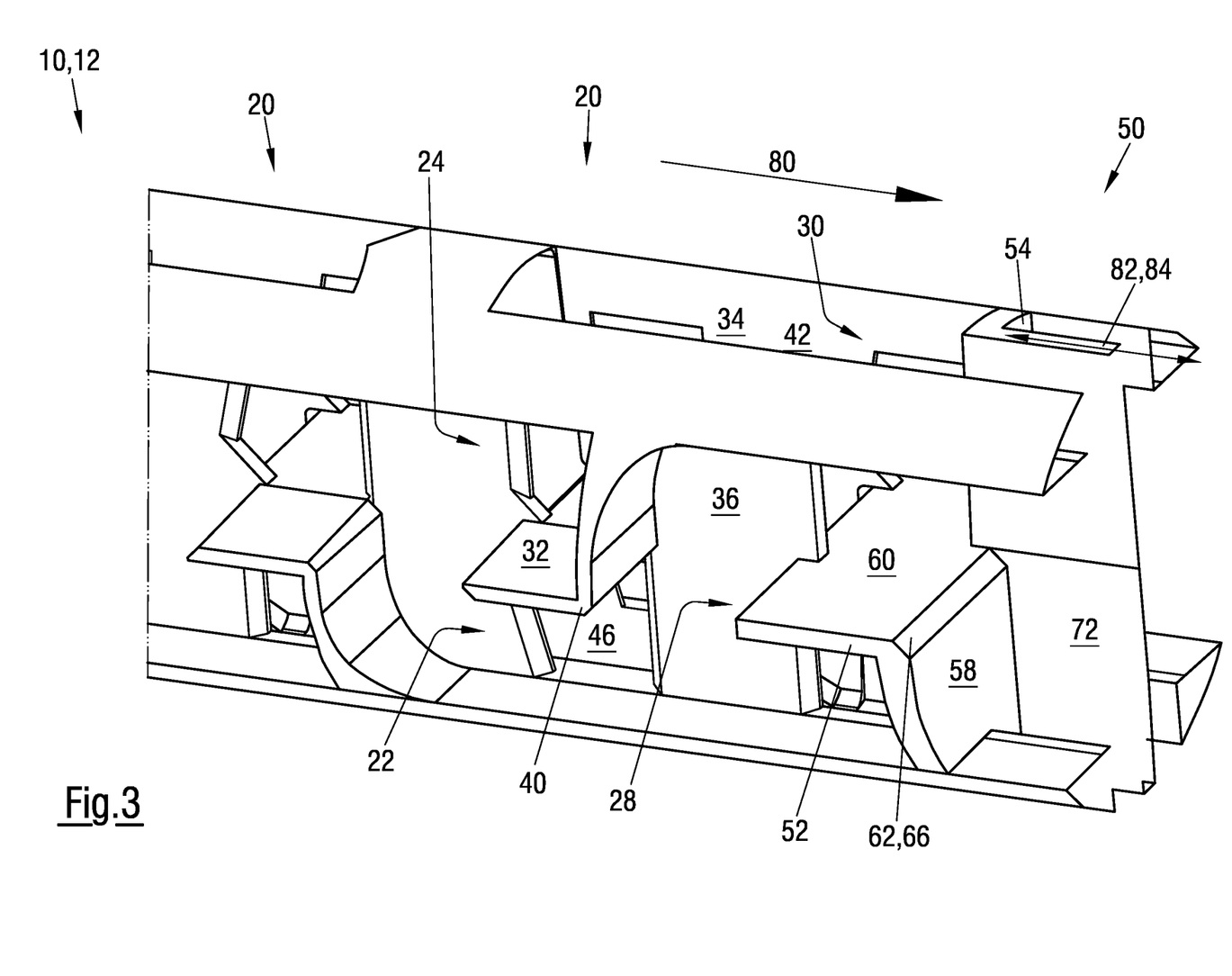
FIG. 3 is a second view of the first possible embodiment of an exchange element.

In FIGS. 2 and 3, a sectional view of a static mixer 10 with first possible embodiment of an exchange element 50 is shown. Hence FIGS. 2 and 3 are described together in the following.

The exchange element 50 is arranged along the longitudinal direction 80 of the mixing element 12 of the static mixer 10 downstream of one of the mixing bodies 20. As all other mixing bodies 20, the depicted mixing body 20 comprises a first inlet 22 (see FIG. 2) and a second inlet 24, (see FIG. 3). A stream of components flowing along the longitudinal direction 80 is divided in an upper and a lower part by an input wall 32 separating a lower first inlet 22 and an upper second inlet 24 of the mixing body 20 and extending in the direction of the longitudinal axis 80. Subsequent to the first and second inlet 24, 26, a deflection element 40 is arranged downstream of and adjacent to the input wall 32, extending transverse to the input wall 32 at both sides of the input wall 32. The deflection element 40 comprises a first opening 42 (see FIGS. 2, 3), a second opening 44 (see FIG. 2) and a third opening 46 (see FIG. 3), each extending through the deflection element 40 from an upstream side of the deflection element 40 to a downstream side of the deflection element 40. The first opening 42 is arranged at one side of the input wall 32 and connects the first inlet 22 with an intermediate outlet 30, and the second 44 and the third opening 46 are arranged at the other side of the input wall 32 and connect the second inlet 24 with the first 26 and the second lateral outlet 28, whereby the intermediate outlet 30 is disposed between the first 26 and the second lateral outlet 28. Further, a first output wall 34 and a second output wall 36 are arranged downstream of and adjacent to the deflection element 40. They extend in the direction of the longitudinal axis 80 and are spaced apart such, that the first output wall 34 separates the first lateral outlet 26 and the intermediate outlet 30 and the second output wall 36 separates the intermediate outlet 30 and the second lateral outlet 28.

In other words, the stream of components impinging on the mixing body 20 is divided in two parts by the input wall 32, wherein the upper part is guided to the intermediate outlet 30 and the lower part is divided and guided to the first 26 and second lateral outlets 30.

Subsequent to the above described mixing body 20, an exchange element 50, provided in a first possible embodiment, is arranged. In particular the exchange element 50 comprises a further deflection element 52 which extends transverse to the longitudinal axis 80 and which is positioned and sized to prevent that the stream of the components exiting the first lateral outlet 26 of the previous mixing body 20 flows through the exchange element 50 in the direction of the longitudinal axis 80 by deflecting the stream in a direction transverse to the longitudinal axis 80 towards the second lateral outlet 28. In the embodiment shown in FIGS. 2 and 3, this task is especially achieved by that the further deflection element 52 comprises a first deflection section 54 and a second deflection section 56 transverse to the longitudinal direction 80, whereby the first and second deflection sections 54, 56 are connected to a first guiding wall 60 along the longitudinal direction 80, the second deflection section 56 upstream to a first part 70 of a second edge 68 of the first guiding wall 60 and the first deflection section 54 downstream to a first part 64 of a first edge 62 of the first guiding wall 60, respectively. In addition, the first deflection section 54 and the second deflection section 56 are arranged at opposite sides of the first guiding wall 60. With this structure, it can be easily ensured that, when seen from the downstream end of the mixing element 12 in the direction of the longitudinal axis 80, the further deflection element 52 covers the complete first lateral outlet 26. A stream of components leaving the previous mixing body 20 through its first lateral outlet 26 is therefore completely blocked in its flow along the longitudinal direction 80 and transversely diverted in direction of the second lateral outlet 28. A second guiding wall 72, arranged at a downstream side of the first 54 and of the third deflection section 58 and rotated with respect to the first guiding wall 60 about the longitudinal axis 80 by an angle of 90°, prohibits flowing back of the aforementioned part of the stream of components back in the direction of the first lateral outlet 36.

In addition, the further deflection element 50 also comprises a third deflection section 58 arranged at a second part 66 of the first edge 62 of the first guiding wall 60. Also the third deflection section 58 and the first deflection section 54 are arranged at opposite sides of the first guiding wall 60. This third deflection section 58 is dedicated to the stream of components leaving the mixing body 20 through its second lateral outlet 28. As depicted in FIGS. 2 and 3, both the first deflection section 54 and the third deflection section 58, respectively, cover a quarter of the cross section of the mixing housing and extend up to a center plane 82, which coincide with a mid-plane 84 defined between the parallel arranged first and second output walls 34, 36 of the previous mixing body 20. By this extension of the first deflection section 54 and the third deflection section 58 up to the center plane 82, also coverage at least of a part of the intermediate outlet 30 of the previous mixing body 20 can be provided.

Figure 4:
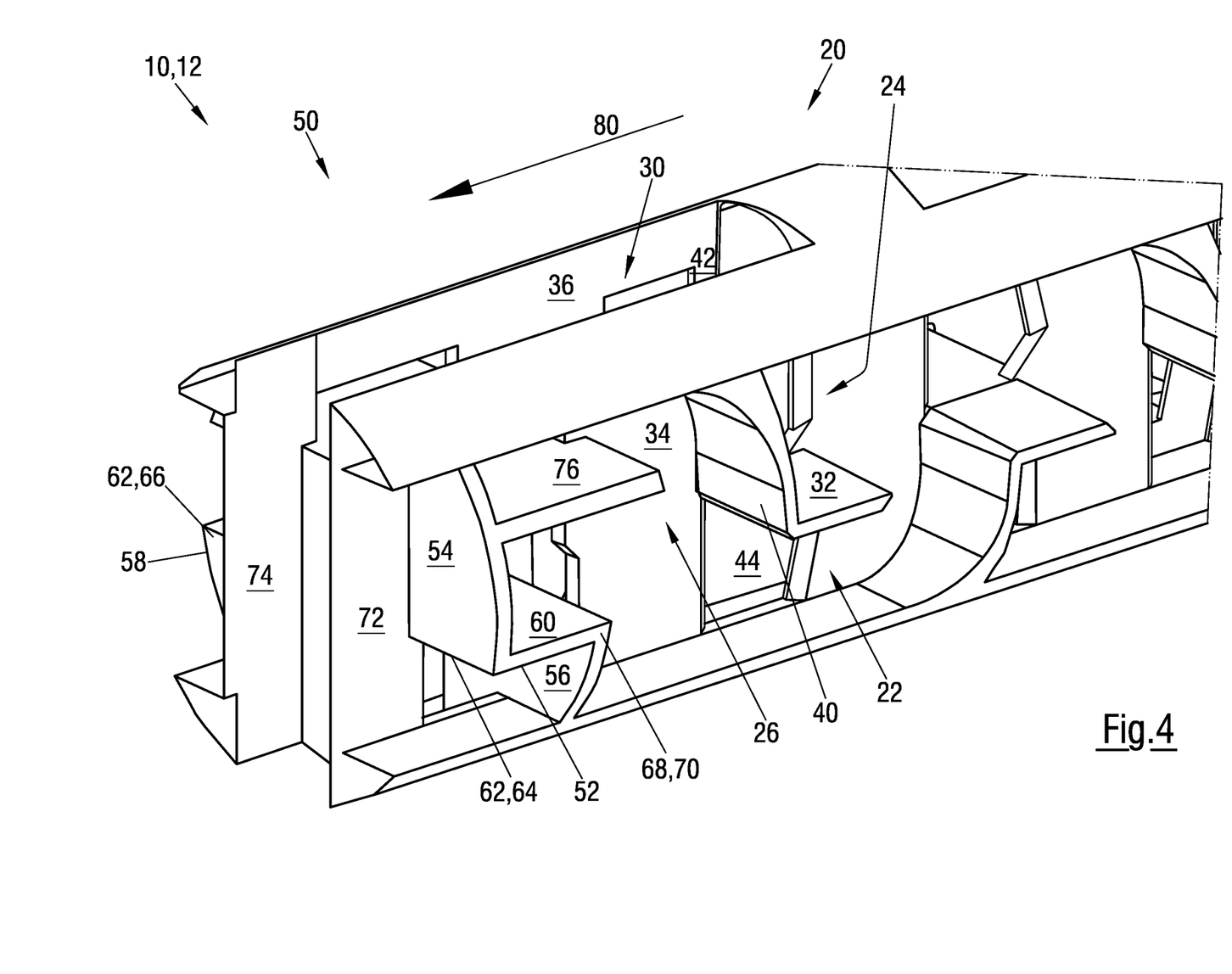
FIG. 4 is a first view of a second possible embodiment of an exchange element.
Figure 5:
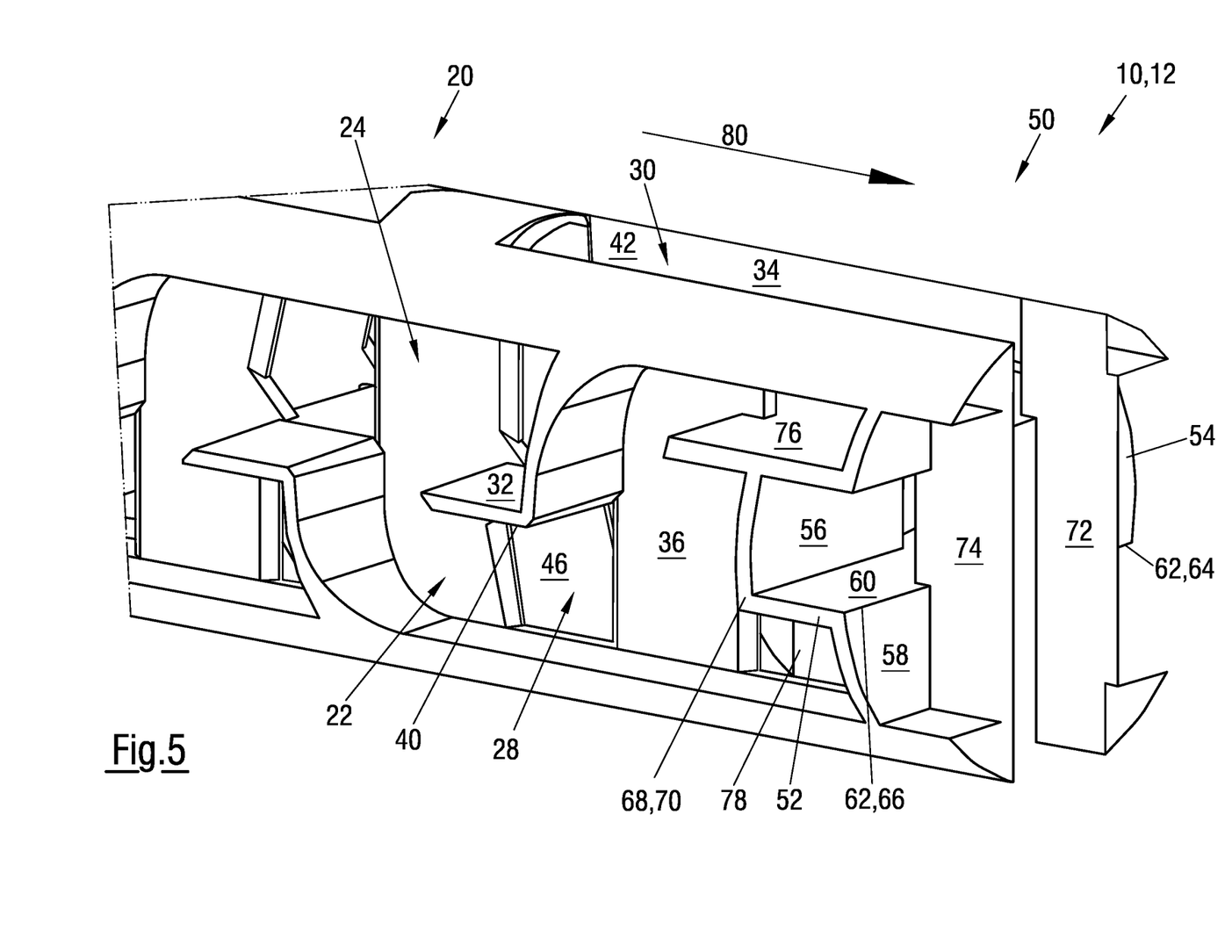
FIG. 5 is a second view of the second possible embodiment of an exchange element.
Figure 6:
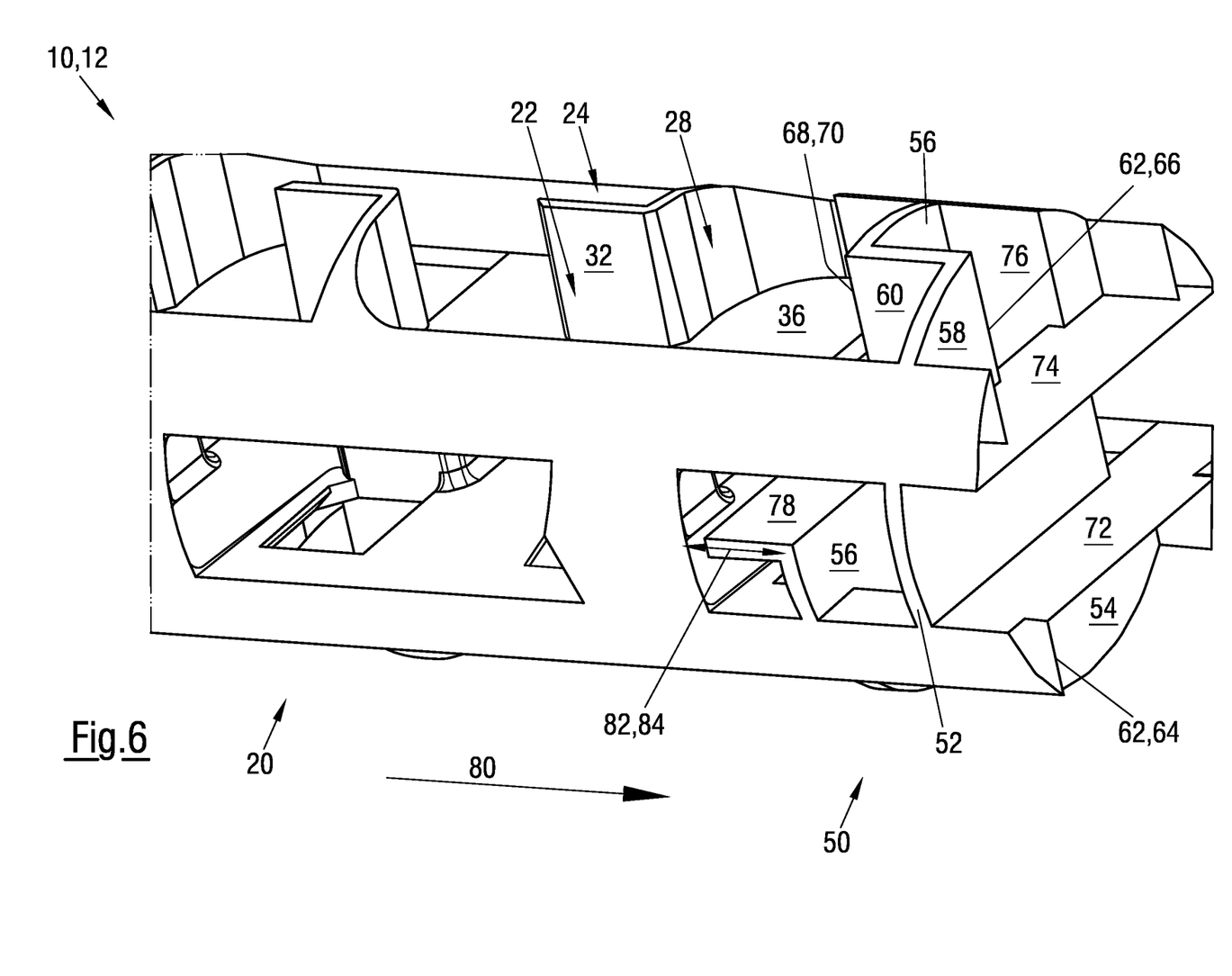
FIG. 6 is a third view of the second possible embodiment of an exchange element.

FIGS. 4 to 6 show another possible embodiment of an exchange element 50 of a static mixer 10 according to the present disclosure. Hence FIGS. 4 to 6 are described together in the following. The mixing bodies 20 are identical to the embodiments already described with respect to FIGS. 2 and 3. Therefore, please refer to the respective description above.

However, the used exchange element 50 differs from the embodiment shown in FIGS. 2 and 3 in such that the exchange element 50 depicted in FIGS. 4 to 6 also provides an additional mixing of the incoming stream of components.

In particular, the present embodiment of the exchange element 50 of a static mixer 10 according to the present disclosure also comprises similar to the embodiment depicted in FIGS. 2 and 3 a further deflection element 52 with a first 54, second 56 and third deflection section 58 and additionally a first 60 and second guiding wall 72. In addition to the embodiment described with respect to FIGS. 2 and 3, this further deflection element 50 further comprises a third 74, fourth 76 and fifth guiding wall 78, all further guiding walls 74, 76, 78 extending along the longitudinal direction. The third guiding wall 74 is disposed at the downstream side of the first 54 and of the third deflection section 58. It runs parallel to the second guiding wall 72. The fourth guiding wall 76 runs parallel to the first guiding wall 60 and is disposed at a downstream side of at least parts of the deflection element 40. The fifth guiding wall 78 runs at an angle of 90° to the first guiding wall 60 and is provided at an upstream side of the second deflection section 56.

The fifth guiding wall 78 divides the incoming stream of components into two substreams, in particular whereby the stream of the intermediate outlet 30 of the previous mixing body 20 is also divided, see in particular FIG. 6. The part of the incoming stream of components above the fourth guiding wall 76 is channeled between the second 72 and third output wall 74, see especially FIGS. 4, 5. The part of the incoming stream of components coming from the first lateral outlet 26 is completely directed to the opposite side of the exchange element 50 with respect to the longitudinal direction 80, whereby the incoming stream of components coming from the second lateral outlet 28 is directed to the complete opposite side of the exchange element 50. All in all, this ensures on the one hand that there is no unaffected flow of components coming from the first lateral outlet 26 flows through the exchange element 50, and hence through the static mixer 10 according to the present disclosure, and on the other hand provides in fact additional mixing of the at least two components to be mixed.

Figure 7:
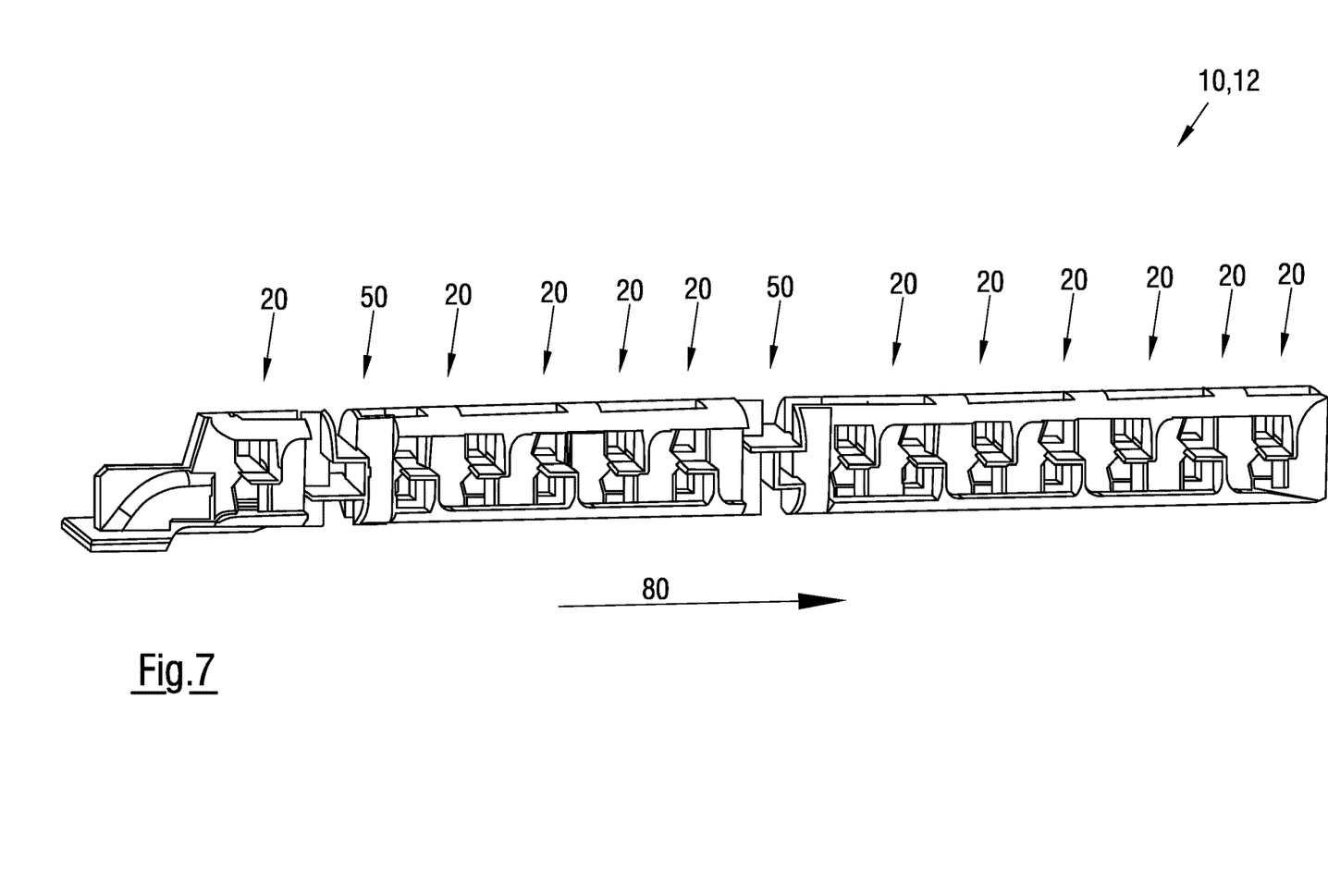
FIG. 7 is a second possible embodiment of a static mixer according to the present disclosure.

FIG. 7 shows a further possible embodiment of a static mixer 10 according to the present disclosure. In this embodiment, two exchange elements 50 in the embodiment depicted in FIGS. 4 to 6 are arranged between two successive mixing bodies 20 which have the same structure and the same orientation with respect to the longitudinal axis 80. In addition, the two exchange elements 50 have the same structure but are rotated with respect to one another about the longitudinal axis 80 by an angle of 180°. With this structure, it can be provided for both intermediate outlets 28, 30 of the respective mixing bodies that flow regions of unaffected component are prohibited.

Figure 8:
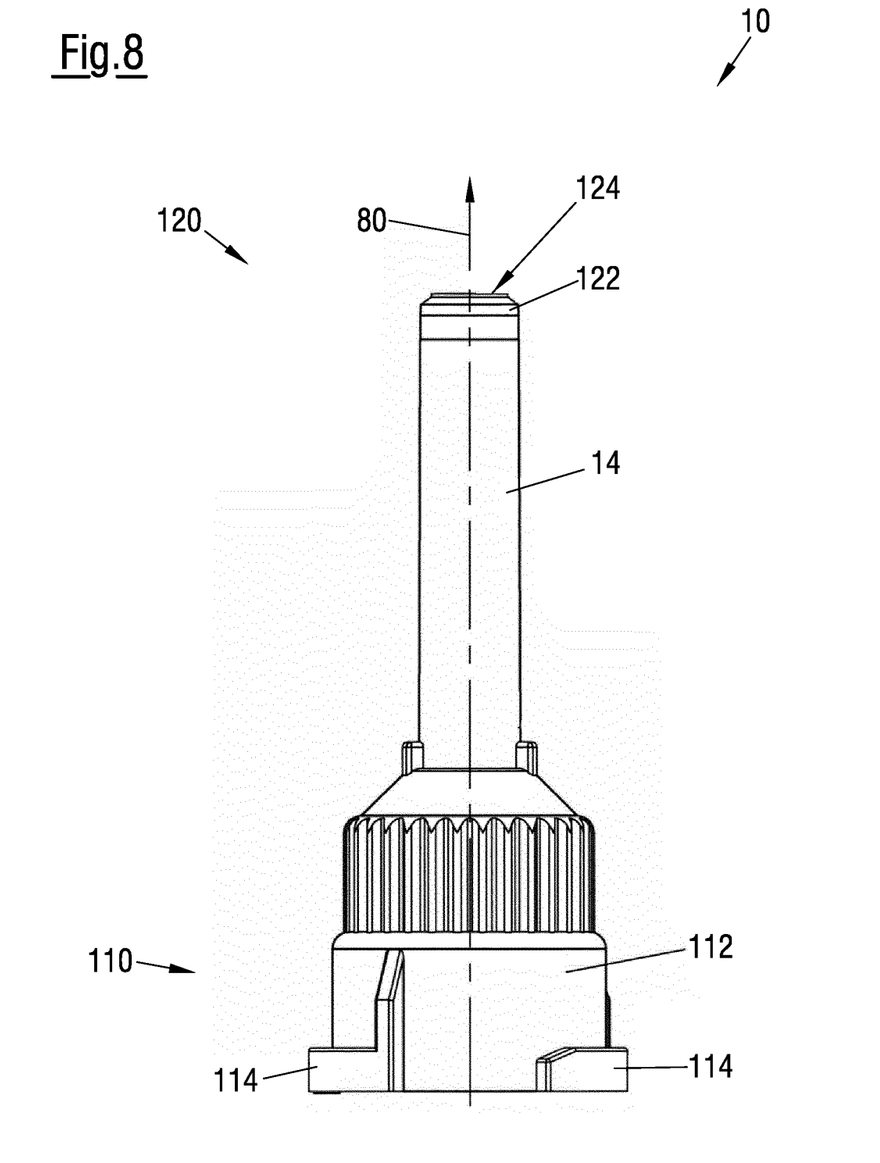
FIG. 8 is a side view of another embodiment of a static mixer according to the present disclosure.
Figure 9:
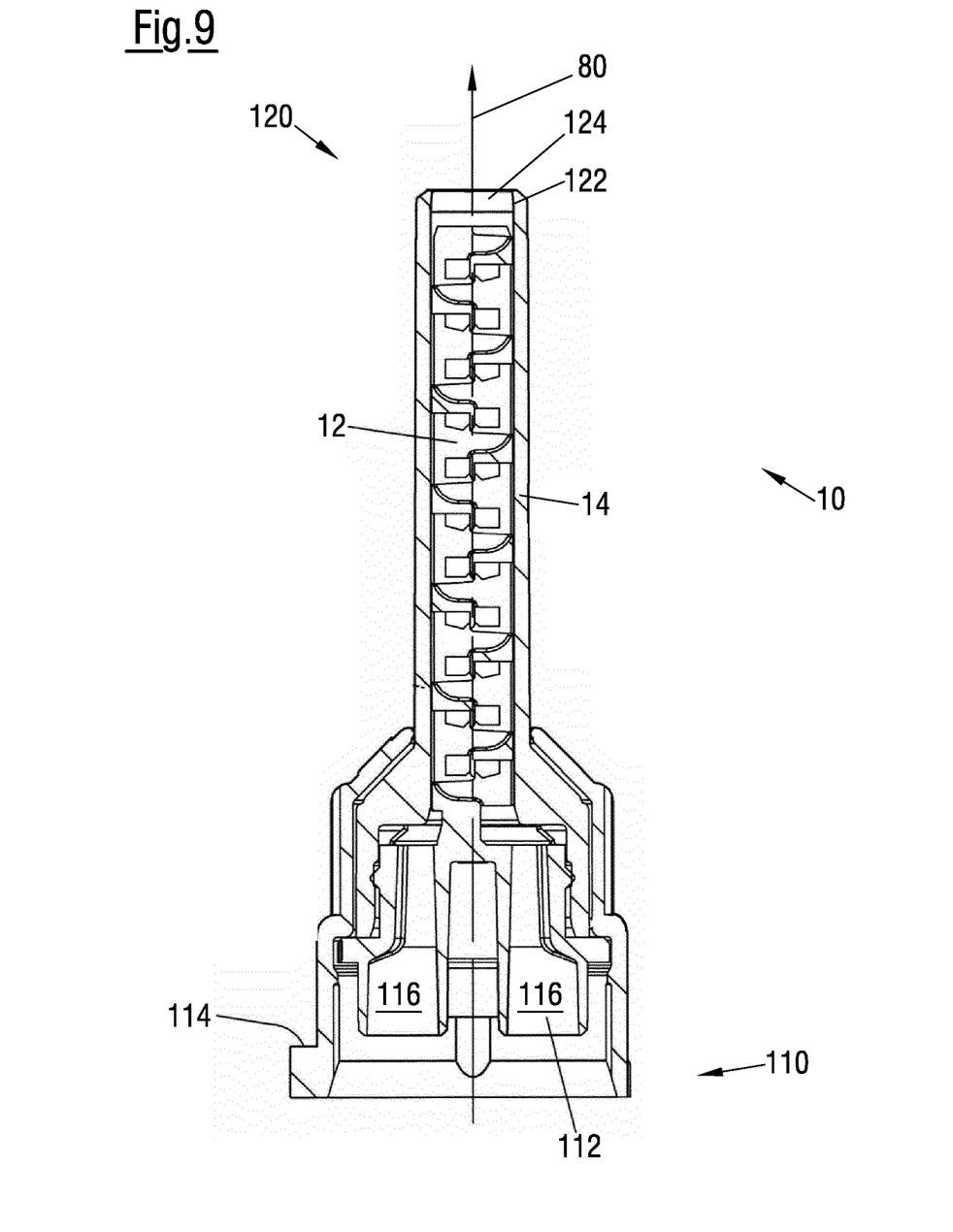
FIG. 9 is a cross-sectional view of the static mixer of FIG. 8.

In FIGS. 8 and 9, a possible embodiment of the static mixer 10 according to the present disclosure is shown, whereby in FIG. 8 a side view and in FIG. 9 a cross-sectional view along the longitudinal axis 80 of the static mixer 10, respectively, is depicted. In the following, FIGS. 8 and 9 are described together.

The static mixer 10 as a whole comprises an inlet section 112 on its first end 110 and an outlet section 122 on its second end 120 positioned opposite to the first end 110 along the longitudinal axis 80. In between, the mixing element 12 is arranged within the mixer housing 14, see especially FIG. 9. The inlet section 112 of the static mixer 10 is surrounded by connecting parts 114 for connecting and/or fastening for instance of cartridges containing the at least two components to be mixed by the static mixer 10 according to the present disclosure. Additionally, the inlet section 112 of the static mixer 10 comprises inlet openings 116 in fluid communication with the mixing element 12 of the static mixer 10, especially with the first and second inlet 22, 24 of the first mixing body 20 (see FIGS. 1 to 3). Hence the components to be mixed, for instance provided by the aforementioned cartridge, enter the static mixer 10 via the inlet openings 116 of inlet section 112 and are subsequently mixed together in and by the mixing element 12 of the static mixer 10 according to the present disclosure. After passing the mixing element 12, the mixed components are discharged at the outlet section 122 of the static mixer 10, in particular via an outlet opening 124. Providing the mixed components with both a high level of mixing of the components and a high positional accuracy, respectively, can thereby be provided especially easily.

The invention claimed is:

1. A static mixer for mixing together at least two components, comprising:
a mixer housing;
a mixing element having a longitudinal axis, an upstream end and a downstream end and being arranged at least partly within the mixer housing, the mixing element comprising a plurality of mixing bodies arranged one after another along the longitudinal axis so as to be capable of repeated separation and re-combination of streams of the components to be mixed,
each of the mixing bodies comprising
a first inlet and a second inlet,
a first and a second lateral outlet and an intermediate outlet disposed between the first and the second lateral outlet,
an input wall separating the first inlet and the second inlet and extending in the direction of the longitudinal axis,
a deflection element arranged downstream of and adjacent to the input wall and extending transverse to the input wall at both sides of the input wall,
a first output wall and a second output wall arranged downstream of and adjacent to the deflection element, and extending in a direction of the longitudinal axis and being spaced apart, the first output wall separating the first lateral outlet and the intermediate outlet and the second output wall separating the intermediate outlet and the second lateral outlet,
the deflection element comprising a first opening, a second opening and a third opening, each opening of the first, second and third openings extending through the deflection element from an upstream side of the deflection element to a downstream side of the deflection element, the first opening being arranged at a first side of the input wall and connecting the first inlet with the intermediate outlet, and the second and the third opening being arranged at a second side of the input wall and connecting the second inlet with the first and the second lateral outlet;
an exchange element arranged between two successive mixing bodies, the exchange element comprising a further deflection element extending transverse to the longitudinal axis and positioned and sized to prevent a stream of the components exiting the first lateral outlet from flowing through the exchange element in the direction of the longitudinal axis and to deflect the stream in a direction transverse to the longitudinal axis towards the second lateral outlet.

2. The static mixer of claim 1,
wherein the further deflection element extends from an inner wall of the mixer housing at least until a center plane of the mixing element running along the longitudinal axis and through the intermediate outlet, the center plane defined by a mid-plane between the first and the second output walls.

3. The static mixer of claim 1,
wherein, when seen from the downstream end of the mixing element in the direction of the longitudinal axis, the further deflection element completely covers the first lateral outlet.

4. The static mixer of claim 3,
wherein, when seen from the downstream end of the mixing element in the direction of the longitudinal axis, the further deflection element covers at least a part of the intermediate outlet.

5. The static mixer of claim 3,
wherein, when seen from the downstream end of the mixing element in the direction of the longitudinal axis, the further deflection element covers at least a part of the intermediate outlet at least partially until the center plane of the mixing element until the second output wall.

6. The static mixer of claim 1,
wherein the further deflection element comprises a first deflection section extending transverse to the longitudinal axis and a first guiding wall extending in the direction of the longitudinal axis and having a first edge and a second edge, at least a first part of the first edge being connected to the first deflection section.

7. The static mixer of claim 6,
wherein the further deflection element comprises a second deflection section extending transverse to the longitudinal axis and at least a first part of the second edge of the first guiding wall is connected to the second deflection section.

8. The static mixer of claim 7,
wherein the further deflection element comprises a third deflection section extending transverse to the longitudinal axis and the third deflection section is connected to a second part of the first edge of the first guiding wall.

9. The static mixer or claim 8,
wherein the first deflection section and the second deflection section are arranged at opposite sides of the first guiding wall, or
the first deflection section and the third deflection section are arranged at opposite sides of the first guiding wall.

10. The static mixer of claim 8,
wherein the first and the third deflection sections each covers a quarter of a cross section of the mixing housing.

11. The static mixer of claim 8,
wherein the first guiding wall is disposed at an upstream side of the first or of the third deflection section.

12. The static mixer of claim 8,
wherein a second guiding wall extending in the direction of the longitudinal axis is disposed at a downstream side of the first or of the third deflection section, the first guiding wall and the second guiding wall being rotated with respect to one another about the longitudinal axis by an angle of 90°.

13. The static mixer of claim 8,
wherein a third guiding wall extending in the direction of the longitudinal axis is disposed at the downstream side of the first or of the third deflection section.

14. The static mixer of claim 13,
wherein a fourth guiding wall extending in the direction of the longitudinal axis is disposed at a downstream side of at least parts of the deflection element.

15. The static mixer of claim 14,
wherein a fifth guiding wall extending in the direction of the longitudinal axis is disposed at an upstream side of the second deflection section.

16. The static mixer of claim 14,
wherein a fifth guiding wall extending in the direction of the longitudinal axis running at an angle of 90° to the first guiding wall is disposed at a upstream side of the second deflection section.

17. The static mixer of claim 13,
wherein a fourth guiding wall extending in the direction of the longitudinal axis running parallel to the first guiding wall is disposed at a downstream side of at least parts of the deflection element.

18. The static mixer of claim 8,
wherein a third guiding wall extending in the direction of the longitudinal axis running parallel to a second guiding wall is disposed at the downstream side of the first or of the third deflection section.

19. The static mixer of claim 1,
wherein two of said successive adjacent mixing bodies have a same structure and are rotated with respect to one another about the longitudinal axis by an angle of 180°, or the two successive mixing bodies arranged between the exchange element have the same structure and a same orientation with respect to the longitudinal axis, or the exchange element is one of two exchange elements, whereby the two exchange elements have a same structure and are rotated with respect to one another about the longitudinal axis by an angle of 180°.

20. The static mixer of claim 1,
wherein the further deflection element extends from an inner wall of the mixer housing at least until a center plane of the mixing element running along the longitudinal axis and through the intermediate outlet, the first output wall and the second output wall running parallel to each other and to the longitudinal axis, the center plane defined by a mid-plane between the first and the second output walls.

* * * * *